Patented Sept. 30, 1952

2,612,508

UNITED STATES PATENT OFFICE 2,612,508

PROCESS FOR CONIDENDROL MAKING

William M. Hearon, Camas, Wash., assignor to Crown Zellerbach Corporation, Camas, Wash., a corporation of Nevada No Drawing. Application December 5, 1949, Serial No. 131,253

8 Claims. (Cl. 260—344.6)

This invention relates to conidendrol and to a process for making the same.

Conidendrol, or 1,2,3,4-tetrahydro-6,7 dihydroxy - 4 - (3,4 - dihydroxyphenyl) - 3 - (hydroxymethyl)-2-naphthoic acid-gamma-lactone, is a derivative of conidendrin, a wood extractive substance present in the sulfite waste liquor obtained during the pulping of western hemlock and other trees and isolated from the liquor by treatment with suitable organic liquids. It is a phenolic compound useful as an antioxidant for edible oils, for petroleum lubricating oils, and for paraffin waxes. It is further useful as a non-staining antioxidant for rubber. It also is useful as a bacteriostat against certain microorganisms. Because of the several reactive functional groups present, it is a valuable starting material for the synthesis of pharmaceuticals and other organic compounds.

The structures of conidendrin and of conidendrol are indicated by the general formula given below, the formula being that of conidendrin when R is a methyl group (CH₃), and that of conidendrol when R is hydrogen (H).

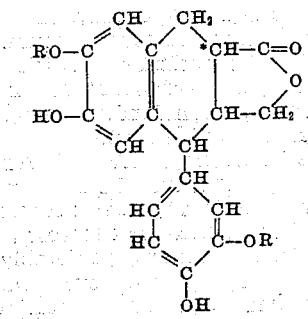

Both conidendrin and conidendrol occur as diasterioisomers, a fact which may be attributable to an inversion taking place at the carbon atom adjacent the carbonyl group of the lactone ring, marked with an asterisk in the formula. Thus conidendrin in the form in which it normally is isolated may be converted by appropriate treatment to a diasterioisomer termed herein beta conidendrin (Holmberg, Ber. 54, 2389 (1921)). I have found by the present investigation that conidendrol also exists in the form of two geometric isomers, the one being termed alpha conidendrol since it has the same basic configuration as the normal conidendrin, and the other being termed beta conidendrol because of its correspondence in geometric structure to beta conidendrin.

As is apparent from a consideration of the general formula given above, conidendrol differs structurally from conidendrin in that the methoxyl groups present in the latter have been converted to phenolic groups. The demethylation reaction required to effect this conversion is difficult to consummate, however, because of the great sensitivity of conidendrin to various chemical reagents. Being a phenol, it is very easily halogenated, as by means of the free bromine which may be present in hydrobromic acid when the latter is used as a demethylating agent. Being a reducing agent, it is sensitive to an oxidizing environment. Furthermore, since it contains phenolic groups and a lactone ring, both of which are very reactive chemically, side reactions occur during the demethylation to produce tars and other unwanted by-products. The problem is further complicated by the fact that reasonably strenuous conditions of reaction are required to effect the demethylation, this favoring the occurrence of the side reactions.

As a result, attempts to demethylate conidendrin to form conidendrol using the great majority of demethylating agents under various conditions result in the formation of a reaction product comprising tarry substances, degradation products of conidendrin, and other by-products from which complex mixture conidendrol cannot be separated as a chemical individual, if it is in fact present therein at all. (Fisher et al., J. Am. Oil Chemists' Soc. 24: 340–343 (October 1947)). In a comprehensive investigation of processes for the demethylation of conidendrin, I have found that, among the conventional demethylating agents which are not successful in the conversion of conidendrin to conidendrol, are various of the mineral acids including hydrochloric acid, sulfuric acid, and nitric acid. Basic materials such as sodium hydroxide also are unsuitable. Still further inapplicable are the organic acids such as paratoluene sulfonic acid and ethane sulfonic acid. Attempts to use various salts such as aluminum chloride, aluminum bromide, and boron trifluoride also have been unsuccessful.

I have discovered furthermore that, of the various available demethylating agents, hydriodic acid is unique in that through its use conidendrin may be converted successfully to pure alpha conidendrol in yields of the order of 70% or better. Thus for the first time, I have been able to prepare alpha conidendrol as a white, crystalline product having a sharp melting point and a distinct chemical identity. Also, when I have employed beta conidendrin as the subject matter of the demethylation, I have been able to prepare for the first time beta conidendrol of characteristic melting point and other physical properties. I also have found that hydriodic acid is an effective catalyst in rendering other demethylating agents applicable in the conversion of conidendrin to pure conidendrol in high yields. This action is obtained even though the hydriodic acid is used in far less than the theoretical amount. A mixture of hydriodic and hydrobromic acids is very effective in accomplishing the conversion, for example, the hydrobromic acid being used in major amount, with just sufficient of the hydriodic acid being present to catalyze the reaction.

In carrying out the process of the present invention, the hydrogen iodide, which normally is supplied in the form of an aqueous solution, is admixed with the conidendrin and with a mutual solvent for the two materials. The resulting solution then is heated, with or without the application of superatmospheric pressure, and maintained at an elevated temperature until the reaction is complete. During this time, there are formed as products of the reaction methyl iodide, which is volatile and largely escapes from the reaction mixture, and conidendrol which remains in solution in the solvent medium. After completion of the reaction, the excess hydrogen iodide and solvent may be removed by distillation and the residue taken up in hot water and filtered to remove solid impurities. Upon cooling the resulting aqueous solution, the conidendrol is deposited as a white, crystalline solid.

The amount of demethylating agent employed in carrying out the process of the invention should be at least about the theoretical quantity required for the demethylation of the conidendrin, i. e. at least two mols for each mol of conidendrin. The upper limit of demethylating agent usage is determined primarily by practical considerations, but normally would not exceed about two and one-half times the theoretical amount. It is preferred to employ slightly more than the theoretical quantity, e. g. about one and one-half times the theoretical amount, this being sufficient to carry the reaction to completion with minimum formation of undesirable by-products.

Where a mixture of hydriodic acid and another demethylating agent such as hydrobromic acid is used, the total amount of the demethylating mixture used likewise is preferably slightly in excess of the theoretical quantity, the amount of the more expensive hydriodic acid being less than about one-quarter of the theoretical amount. This amount of hydriodic acid has a pronounced catalytic effect on the reaction, since, even though it is present in far less than the theoretical amount, it causes the reaction to take place smoothly and to produce a pure product.

The conidendrin and demethylating agent are maintained in solution during the reaction by means of a mutual solvent. Acetic acid is a preferred solvent for this purpose, although other suitable solvents may be employed such as propionic acid, butyric acid, dioxan, and the like, used either singly or in admixture with each other. A sufficient amount of the solvent should be employed to dissolve the conidendrin and demethylating agent rapidly, and to keep them, as well as the products of the reaction, in solution during the reaction period. From about 20% to about 75% by weight of acetic acid, based on the weight of the reaction mixture, preferably is employed. Below about 20% the time for solution of the conidendrin is markedly increased, and little, if any, benefit is obtained by increasing the amount of solvent above about 75%.

A secondary reducing agent preferably is also incorporated in the reaction mixture in amount sufficient to prevent the formation of free halogen, e. g. free iodine or free bromine. This prevents halogenation of the conidendrin as a side reaction. It also prevents the formation of hypo acids from the combination of the iodine or the bromine with the water content of the reaction mixture, thereby preventing the oxidation of the conidendrin and the conidendrol as another undesirable side reaction. A relatively minor proportion only of reducing agent is necessary to accomplish this purpose, for example from about 1 to about 3 parts by weight of reducing agent for each 100 parts by weight of demethylating agent. Examples of suitable reducing agents which may thus be employed are red phosphorus, hypophosphorous acid and the like.

The temperature at which the demethylation is carried out should be sufficient to initiate the reaction without being so high as to promote the formation of decomposition products of the conidendrin or conidendrol. In general, when using from about 20% to about 75% of acetic acid as a solvent, temperatures within the range of between about 95° C. and about 125° C. are suitable at atmospheric pressure. In this case, the boiling temperature of the mixture, i. e. a temperature of about 118° C., is a preferred reaction temperature. Where the reaction is carried out at elevated pressures, e. g. pressures of from about 5 p. s. i. to about 100 p. s. i., somewhat higher temperatures may be used, e. g. temperatures of the order of 140°–150° C.

The time of heating is variable with the temperature, the concentration of the demethylating agent employed, and the pressure applied. When using concentrated hydriodic acid at the more elevated temperatures and pressures, the reaction period may be only a few minutes. Where the opposite conditions prevail, the reaction period may be as much as several hours. When operating under the optimum conditions, however, a reaction period of about one hour will suffice to convert the conidendrin to high yields of pure crystalline conidendrol.

After completion of the demethylation reaction, the conidendrol product may be recovered from the reaction mixture in any one of several ways. As outlined above, it may be recovered by distilling the reaction mixture, preferably under diminished pressure to remove excess acid and solvent, after which the residual material is dissolved in hot water, filtered hot, if necessary, and permitted to cool. As the aqueous solution cools, the conidendrol is precipitated in crystalline form.

Alternatively, the reaction mixture may be diluted with about an equal volume of water and its acid content neutralized with sodium bicarbonate or other base. The neutralized mixture then may be extracted with ether for removal of the conidendrol and the ether layer separated from the aqueous layer, after which the ether is removed by distillation from the solid conidendrol. The latter then is taken up in hot water and crystallized therefrom in the manner indicated above.

Still another method of recovering the conidendrol is to pour the reaction mixture directly into hot water and permit the resulting solution to cool. Thereupon the conidendrol will crystallize directly from the aqueous medium.

The product as obtained by crystallization from water contains two molecules of water of hydration and is a white crystalline solid melting at from 102° C. to 103° C. It may be converted to the anhydrous condition by heating, e. g. by heating at 95° C. for one hour. The anhydrous product melts at 165° C. to 166° C. Of the two forms, the dihydrate is the stable form under usual atmospheric conditions, the anhydrous material reverting to the dihydrate upon exposure to the atmosphere.

Beta conidendrol is prepared in a manner similar to that outlined above, except that beta conidendrin is used as a starting material rather than conidendrin in the form normally isolated from sulfite waste liquor. Thus beta conidendrin as formed by the action of alcoholic sodium ethoxide on conidendrin (Holmburg, supra) may be dissolved in acetic acid or other suitable solvent and mixed with at least the theoretical amount of hydriodic acid, or a mixture of hydriodic acid and another demethylating agent such as hydrobromic acid. The resulting mixture may be heated, as by boiling under reflux, until the conversion to beta conidendrol is complete. The reaction mixture then may be distilled to remove the volatile materials, after which the residue may be dissolved in hot water and the beta conidendrol recrystallized therefrom. The beta conidendrol thus formed is a white crystalline material melting at 251° C. to 252° C. As opposed to the alpha conidendrol, it does not appear to form a dihydrate.

The following examples illustrate the process of the present invention in greater detail.

EXAMPLE I

This example illustrates the use of hydriodic acid at normal atmospheric pressure in converting the conidendrin to alpha conidendrol.

A mixture of 5 g. finely divided conidendrin, 25 ml. 57% hydriodic acid, 25 ml. glacial acetic acid, and 0.5 red phosphorus was gently refluxed 30 minutes under an air condenser through which the methyl iodide was allowed to escape as it was formed. The temperature of the mixture rose to 118° C. in 10 minutes and remained there during the rest of the refluxing period. The mixture was transferred to a distilling flask and 60 g. distillate removed by heating on a steam bath under reduced pressure from an aspirator. The syrupy residue was taken up in 100 ml. hot water, filtered hot to remove the phosphorus, and allowed to cool. The nearly colorless precipitate was removed from the filter, washed with water and dried in air at room temperature giving 4.3 g. or 76% of theory of alpha conidendrol dihydrate melting at 102–103° C. Heating the product at 100° C. for one hour produced the anhydrous material M. P. 165–166° C. which, however, regained two molecules of water by standing in air.

$$\alpha]_D^{25} -83.5 \text{ (acetone, C=2, for dihydrate)}$$

Anal. Calcd. for $C_{18}H_{16}O_6$: C, 65.9; H, 4.91; $OCH_3$, 0.0. Found: C, 66.0; H, 4.91; $OCH_3$, 0.09. Calcd. for $C_{18}H_{16}O_6 \cdot 2H_2O$: C, 59.3; H, 5.53. Found: C, 59.1; H, 5.32.

The conidendrol was soluble in hot water and in cold aqueous alkali or carbonate. It reduced Fehling's solution in the hot, and gave an immediate black precipitate of silver with Tollens' reagent. An aqueous solution gave a dark green color with ferric chloride which turned to a deep red on the addition of sodium carbonate. It dissolved quickly in aqueous sodium hydroxide to give a yellow solution turning almost at once to green, then blue. Warming changed this to black, then brown, and finally to red. A solution in aqueous sodium carbonate was yellow, turning a deep red on heating.

In addition, the conidendrol was very soluble in methanol, ethanol, acetone, and acetic acid. It was soluble in diethyl ether, and slightly soluble in benzene and chloroform. It was very slightly soluble in ligroin, and insoluble in carbon tetrachloride.

The identity of the alpha conidendrol was further established by the preparation of two derivatives, i. e. alpha conidendrol tetrabenzoate and alpha tetramethyl conidendrol.

*Alpha conidendrol tetrabenzoate.*—A mixture of 5 g. alpha conidendrol, 25 ml. benzoyl chloride and 40 ml. dry pyridine was left at room temperature for 16 hours. The mixture was taken up in diethyl ether and washed successively with dilute hydrochloric acid, water, dilute sodium carbonate, and water. The ether was dried over sodium sulfate and evaporated to a syrup which was stirred on a steam bath with 200 ml. ethanol, whereupon a voluminous white, crystalline precipitate formed. Weight 7.7 g. or 68% of theory. M. P. 176–177° C. Recrystallization from 2:1 ethanol-acetone gave 7.0 g. (62%) melting at 179–180° C.

$$\alpha]_D^{25} -75° \text{ (acetone, C=2)}$$

Anal. Calcd. for $C_{46}H_{32}O_{10}$: C, 74.2; H, 4.33. Found: C, 74.4; H, 4.41.

*Alpha tetramethyl conidendrol.*—To a mixture of 1.0 g. alpha conidendrol dihydrate, 30 ml. water, and 3 ml. dimethyl sulfate, rapidly stirred, was added 5% aqueous sodium hydroxide over a 1.5 hour period, the mixture being maintained slightly alkaline. After standing 0.5 hour, the dark solution was made acid with dilute sulfuric acid to deposit a tar. The mixture then was heated on a steam bath for four hours during which time the tar became crystalline. The cooled mixture was filtered, giving 1.0 g. (95% yield) of tan colored crystals. Three recrystallizations from hot ethanol gave white crystals melting at 177–178° C. Alpha dimethyl conidendrin made by direct methylation of conidendrin [Brauns, J. Org. Chemistry 10, 216 (1945)] melted at 179–180° C. and did not depress the melting point of the methylated alpha conidendrol.

EXAMPLE II

This example illustrates the use of hydriodic acid under pressure in the conversion of conidendrin to alpha conidendrol. A mixture of 20 g. conidendrin, 19 ml. 57% hydriodic acid and 120 ml. glacial acetic acid was heated, with occasional shaking, for one hour at 140° C. in a glass lined bomb. The syrup, after removal of excess acids, was taken up in 500 ml. hot water which, on cooling, deposited 14.2 g. (70% of theory) white alpha conidendrol dihydrate, melting at 101–102° C.

EXAMPLE III

This example illustrates the use of a mixture of hydrobromic and hydriodic acids in the process of the invention.

A mixture of 20 g. conidendrin, 39 ml. 48% hydrobromic acid, 5 ml. 57% hydriodic acid, 114 ml. glacial acetic acid, and 3 ml. 50% hypophosphorous acid was refluxed for 3 hours. The syrup remaining after the excess acids were removed was taken up in one liter of hot water, filtered and allowed to cool giving 15 g. (73% of theory) of alpha conindendrol dihydrate melting at 100–101° C.

EXAMPLE IV

This example illustrates the preparation of beta conindendrol by the demethylation of beta conindendrin.

A mixture of 5 g. beta conindendrin, 25 ml. 57% hydriodic acid and 25 ml. glacial acetic acid was refluxed for 30 minutes. The excess acids were removed on the steam bath under reduced pressure, and the resulting syrup was dissolved in 125 ml. hot water which deposited 2.8 g. (61% yield) of a mixture of white and brown crystals after standing four hours at 50° C. and 16 hours at room temperature. Recrystallization from 40 ml. hot water containing 0.5 g. sodium sulfite gave 1.9 g. (41% yield) of white crystals melting at 251 to 252° C.

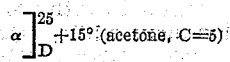
$$\alpha\Big]_D^{25} +15° \text{ (acetone, C=5)}$$

Anal. Calcd. for $C_{18}H_{16}O_6$: C, 65.9; H, 4.91; $OCH_3$, 0.0. Found: C, 66.0; H, 5.01; $OCH_3$, 0.08.

The beta conindendrol was soluble in hot water, cold aqueous alkali, or sodium carbonate and in most of the common organic solvents. It reduced hot Fehling's solution and gave an immediate black precipitate of silver with Tollens' reagent. An aqueous solution of beta conindendrol gave a light green color with ferric chloride which turned to deep red with sodium carbonate. Beta conindendrol dissolved quickly in aqueous sodium hydroxide to give a yellow solution which on heating turned successively green, blue, black, brown, and red. A solution of the substance in aqueous sodium carbonate was yellow, turning to orange on heating.

*Beta conindendrol tetraacetate.*—This derivative of beta conindendrol was prepared by treating a suspension of 4 g. beta conindendrol in 20 ml. acetic anhydride with one drop of concentrated sulfuric acid. Heat was evolved and a clear solution resulted which was left at room temperature 16 hours. Addition of water gave 5.1 g. (84% yield) colorless crystals melting at 175–8° C. Recrystallization from hot ethanol gave 4.9 g. (81% of theory) of beta conindendrol tetraacetate melting at 179–180° C.

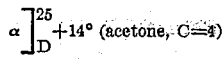
$$\alpha\Big]_D^{25} +14° \text{ (acetone, C=4)}$$

Anal. Calcd. for $C_{26}H_{24}O_{10}$: C, 62.9; H, 4.87. Found: C, 62.8; H, 4.94.

The following examples illustrate the inapplicability of various conventional demethylating agents to the presently described process.

EXAMPLE V

*Aluminum chloride.*—A mixture of 2 g. conidendrin, 30 ml. benzene and 5 g. of aluminum chloride was refluxed for 4½ hours. The aluminum chloride complex was destroyed with hydrochloric acid and the solution extracted with ethyl ether. The ether solution was washed and dried and the ether evaporated, leaving a light tan fluffy product. This was partially demethylated, but still contained 7.28% methoxyl. It could not be crystallized.

EXAMPLE VI

*Aluminum bromide.*—A mixture of 5 g. conidendrin, 200 ml. toluene and 8.7 g. of aluminum bromide was refluxed 4¾ hours. Treatment of the solution with hydrochloric acid and ether extraction gave several fractions, consisting mainly of unreacted alpha conidendrin. There was also present 2.5 g. of brown gummy material of indefinite composition. Evidently it was a mixture of decomposition products. It could not be crystallized.

EXAMPLE VII

*Hydrochloric acid.*—Conidendrin in water and acetic acid solutions was mixed with various concentrations of hydrochloric acid. Temperatures from 100° to 200° C. and various reaction times were investigated in a series of experiments. Two results were obtained. Either the alpha conidendrin was unchanged or it had become a black tar. There was no intermediate product obtainable.

EXAMPLE VIII

*Potassium hydroxide.*—Five grams of conidendrin were mixed with 5 g. potassium hydroxide and the mixture was fused for 20 minutes. The melt was pulverized, acidified and extracted with ether. The residue from evaporation of the ether was a brown powder containing 11.5% methoxyl. It could not be crystallized.

EXAMPLE IX

*Sodium hydroxide.*—A solution of 5 g. conidendrin in 150 ml. of 7% sodium hydroxide was held at 300° C. for 1½ hours. A large amount of white material insoluble in acid, base or organic solvents was deposited on the glass liner. The solution was extracted with ether, giving a black viscous tar which could not be crystallized.

EXAMPLE X

*Nitric acid.*—Concentrated or dilute nitric acids reacted with conidendrin in the cold to release large amounts of nitrogen oxides. These apparently acted as oxidizing agents, preventing the formation of a stable conidendrol or destroying it, if formed.

EXAMPLE XI

*Sulfuric acid.*—Conidendrin treated with concentrated sulfuric acid turned black and charred almost immediately. Refluxing conidendrin with sulfuric acid did not change the conidendrin.

EXAMPLE XII

*Alkane sulfonic acids.*—A mixture of 5 g. conidendrin and 40 ml. mixed alkane sulfonic acids was warmed at 80° C. for one hour. Some of the solution was poured into water. The gray precipitate which formed had very little reducing action, hence was not conidendrol. The remaining portion of the solution was heated at 183° C. for 25 minutes. The only product was a black tar.

EXAMPLE XIII

*Boron fluoride.*—A mixture of 1 g. conidendrin in 10 ml. boron fluoride-methyl ether complex was warmed gently for 30 minutes. The solution was cautiously poured into water. The conidendrin was recovered unchanged from the water.

EXAMPLE XIV

*Hydrobromic acid.*—A mixture of 20 g. purified conidendrin, 125 ml. acetic acid and 16 ml. 48% hydrobromic acid (1.25×theory was placed in a bomb and heated at 142° C. for one hour with constant agitation. The bomb was cooled, opened, and the contents poured into 600 ml. of boiling water containing a little sodium bisulfite. The dark brown solution was not lightened by the addition of more sodium bisulfite. The solution then was cooled and seeded with alpha conidendrol. After three days there was no precipitate of any kind. The solution was black and opaque. This result is in direct contrast to the result of the procedure outlined in Example II wherein a successful result was obtained using hydriodic acid, rather than hydrobromic acid, under substantially the same reaction conditions.

Having now described my invention in preferred embodiments, I claim:

1. The process for the production of conidendrol which comprises reacting conidendrin with a demethylating agent comprising hydriodic acid, the hydriodic acid being used in amount at least equal to about two mols of hydriodic acid for each mol of conidendrin.

2. The process for the production of conidendrol which comprises reacting conidendrin with a demethylating mixture comprising hydriodic acid and a second demethylating agent, the demethylating mixture being used in amount at least equal to about two mols of demethylating mixture for each mol of conidendrin.

3. The process of claim 2 wherein the second demethylating agent comprises hydrobromic acid.

4. The process for the production of beta conidendrol which comprises reacting beta conidendrin with a demethylating agent comprising hydriodic acid, the hydriodic acid being used in amount at least equal to about two mols of hydriodic acid for each mol of conidendrin.

5. The process for the production of beta conidendrol which comprises reacting beta conidendrin with a demethylating mixture comprising hydriodic acid and a second demethylating agent, the demethylating mixture being used in amount at least equal to about two mols of demethylating agent for each mol of conidendrin, and the hydriodic acid constituent thereof being used in a minor but catalytic amount.

6. The process of claim 5 wherein the second demethylating agent comprises hydrobromic acid.

7. The process for the production of conidendrol which comprises reacting conidendrin at a temperature of between about 95° C. and about 150° C. with hydriodic acid in amount at least equal to about two mols of hydriodic acid for each mol of conidendrin.

8. The process for the production of conidendrol which comprises forming a solution of conidendrin and hydriodic acid in a mutual solvent therefor, and heating the resulting solution at a temperature of between about 95° C. and about 150° C., whereby to effect the demethylation of the conidendrin and its conversion to conidendrol.

WILLIAM M. HEARON.

REFERENCES CITED

The following references are of record in the file of this patent:

Fisher: American Oil Chemists' Soc., vol. 24 (1947), pp. 340–343.

Fieser et al.: Org. Chem. (Heath), 2nd ed., pp. 138–139 (1950).

Erdtman et al.: Acta Chem. Scand. (1949), vol. 3, pp. 982–984.